UNITED STATES PATENT OFFICE.

RUDOLF BLITZ, OF PARIS, FRANCE.

MANUFACTURE OF PAPER, &c.

SPECIFICATION forming part of Letters Patent No. 289,212, dated November 27, 1883.

Application filed July 12, 1883. (No specimens.)

*To all whom it may concern:*

Be it known that I, RUDOLF BLITZ, of the city of Paris, France, have invented a new and improved process for the manufacture of a kind of fibrous, woody cellulose, white or not, presenting the characteristics of rag pulp and able to replace cellulose in all its applications, especially in the manufacture of paper, of which the following is a full, clear, and exact description.

All kinds of soft wood may be utilized in this manufacture. The wood is reduced into fragments by means of any of the processes already known and employed in the treatment of "cellulose" or woody matters. Then, after having been reduced to fragments more or less large, it is placed in a boiler, where it is kept during a period of time that varies, according to the nature of the wood, from four to eight hours, under a pressure of from three to four atmospheres, together with the following matters, of which the proportions given are not absolute and may be modified: For three cubic meters, six hundred decimeters of wood are taken; six kilograms of hydrosulphite of soda; three kilograms of caustic soda; one gram of vanadiate of ammonia dissolved in four grams of hydrochloric acid. The hydrosulphite of soda may be replaced by hydrosulphite of potash or any other alkaline hydrosulphite or any other metallic hydrosulphite suitable. In the case of hydrosulphite of potash being employed, the caustic soda would be replaced by caustic potash, and the same rule should be followed in the other cases in order to obtain advantageous results. This "lixiviation" terminated, the wood is afterward submitted to the action either of a crusher, like those employed in the treatment of cellulose, or to the action of disintegrators, such as those in use for the manufacture of wood pulp. The cellulose thus obtained may be whitened by means of any of the ordinary processes; it is very supple, and "felts" easily.

My process may be utilized in the treatment of all vegetable matters.

I claim—

The composition of hydrosulphite of soda, caustic soda, vanadiate of ammonia, and hydrochloric acid, in about the proportions specified, for transforming wood fiber into pulp, substantially as specified.

RUDOLF BLITZ.

Witnesses:
EDWARD P. MACLEAN,
JEAN BAPTISTE ROLLAND.